*(12)* United States Patent
Walter

(10) Patent No.: US 7,511,390 B1
(45) Date of Patent: Mar. 31, 2009

(54) DUAL FET OUTPUT STAGE WITH CONTROLLED OUTPUT DV/DT FOR REDUCED EMI AND INPUT SUPPLY NOISE

(75) Inventor: William Louis Walter, Lowell, MA (US)

(73) Assignee: Linear Technology Corporation, Milpitas, CA (US)

( * ) Notice: Subject to any disclaimer, the term of this patent is extended or adjusted under 35 U.S.C. 154(b) by 326 days.

(21) Appl. No.: 11/191,968

(22) Filed: Jul. 29, 2005

(51) Int. Cl.
*B23K 11/24* (2006.01)
*H02B 1/24* (2006.01)
(52) U.S. Cl. .................................. 307/112; 307/115
(58) Field of Classification Search ............. 307/112, 307/113, 115, 139
See application file for complete search history.

(56) References Cited

U.S. PATENT DOCUMENTS

| | | | | |
|---|---|---|---|---|
| 5,406,469 A * | 4/1995 | Schwarz | ...................... | 363/19 |
| 6,040,686 A | 3/2000 | Schenkel | | |
| 6,172,525 B1 * | 1/2001 | Wennekamp | ................ | 326/83 |
| 6,400,106 B1 | 6/2002 | Magruder et al. | | |
| 6,411,531 B1 | 6/2002 | Nork et al. | | |
| 6,842,046 B2 * | 1/2005 | Tzartzanis et al. | ............ | 326/98 |
| 6,989,612 B2 * | 1/2006 | Cividino et al. | ................ | 307/58 |
| 2004/0207373 A1 | 10/2004 | Muller et al. | | |

OTHER PUBLICATIONS

Dallas Semiconductor MAXIM; *DC-DC Converter Tutorial*; http://www.maxim-ic.com/appnotes.cfm/appnote_number/710; c. 2004; Maxim Integrated Products.

* cited by examiner

*Primary Examiner*—Stephen W Jackson
*Assistant Examiner*—Carlos Amaya
(74) *Attorney, Agent, or Firm*—McDermott Will & Emery LLP

(57) ABSTRACT

The slew rate of switching circuits, e.g. for DC to DC converters, is controlled without unduly sacrificing total switching time, by providing a weaker switching transistor in parallel with each stronger main switching transistor. Switching of the weaker transistor is controlled so as to have a slower slew rate in transitions between switch states than transitions of the main transistor. The main transistor switches at a fast rate for efficiency, but the slower transition by the weaker transistor provides a more gradual transition of the voltage at the desired switching node, so as to reduce EMI and/or input supply noise.

6 Claims, 7 Drawing Sheets

DUAL FET OUTPUT STAGE WITH CONTROLLED OUTPUT DV/DT FOR REDUCED EMI AND INPUT SUPPLY NOISE

TECHNICAL FIELD

The disclosed teachings relate to switching circuitry, and more particularly to methodology and circuits to provide fast switching in switching regulators (e.g. DC/DC converters) or other fast switching applications.

BACKGROUND

A regulator is a circuit that supplies power from a source at a controlled or regulated level of voltage and/or current. Linear and switching regulators are known, for providing regulated direct current (DC) power for modern electronic devices. A switching regulator uses an energy storage circuit, typically formed by a capacitance, an inductance (e.g. inductor or transformer) or a combination thereof, together with one or more switches to effectively transfer electrical energy from the source to a regulated output. Advantages of switching regulators are well known. One particular advantage of the switching approach is that it is a fairly simple matter to rearrange the energy storage circuit and switches to convert voltage up (boost), convert voltage down (buck) or provide a voltage inversion.

As the DC/DC converter/regulator circuit operates to switch between circuit states, power is transferred in discrete units or packets. Switched power transfer, however, creates noise or ripple in the flow of input current from the power source, which tends to generate on-chip voltage spikes and EMI. As switching rates of DC/DC switching converters are increasing (>IMHz), on-chip transients and radiated EMI due to switch node transition are becoming an issue. Due to higher operating frequencies, it is desirable to minimize the transition time required when switching to minimize power losses and blanking time for switch settling. Blanking time is the time between turn-off of one switch and the time of turn-on of the other switch, typically, to avoid shoot-through. Unfortunately fast slewing of the switch node to minimize the transition time results in high on-chip supply transients and high external radiated EMI. It may be helpful to consider an example.

FIG. 1a is a circuit diagram showing the switch circuit for a DC-DC converter (with energy storage elements omitted, for convenience). Although connection to the energy storage elements will vary depending on the desired application, buck, boost or inverter, the principal elements and arrangement of the switching circuit will be substantially similar.

The circuit diagram shows a buck converter switch configuration with very fast turn on and turn off times. A p-type metal oxide semiconductor (PMOS) type field effect transistor (FET) P1 selectively connects input voltage VIN through a small resistance (typically an on-chip metal resistance) to a switch node SW. An n-type metal oxide semiconductor (NMOS) FET transistor N1 selectively connects switch node SW to ground, through small resistance (typically metal-on-chip resistance). The switching transistors P1 and N1 are relatively strong transistors, for efficiency, in that the characteristic impedance from drain to source, when each transistor is on, is very low. Because the impedance is low, the voltage drop across the on transistor is low for a given current through the transistor, and the transistor consumes relatively little operating power. Each switch has to hold the switch node SW at the desired state (connected to VIN through P1, or connected to ground through N1), but it is desirable for the respective transistor to hold the state while consuming relatively little power. Hence, the transistors P1 and N1 are much stronger than would normally be needed to hold the switch node SW in the respective state. Often, the characteristic impedance from drain to source is on the order of 1Ω or less, commonly on the order of tens to hundreds of mΩ, to achieve 90% efficiency for the regulator circuit. Impedance is sized to facilitate desired output requirements of the particular converter application.

The current source load (ILOAD) represents the standing current in the inductor L of the buck converter. The inductor L of the buck converter is connected from the switch node SW to the output voltage (VOUT) node shown. The other elements of the circuit shown in FIG. 1a relate to the logic circuitry to control the timing of the switching on and off of the switching transistors P1 and N1, in response to the high-speed switching signal VCLK.

Because the transistors P1 and N1 are strong transistors, they can transition the switch node SW quickly.

FIG. 1b shows selected switching waveforms for the circuit in FIG. 1a (assuming that VIN=5V and ILOAD=1 A). In FIG. 1b, the upper graph shows the current (I) that flows through resistor RB2, that is, the input current flowing from the source VIN. The upper graph also shows the absolute value of the change (dI/dt) of the current from the input, referred to as ABS(DI(RB2))/dt) (in A/ns) in the drawing. The two spikes in the graph ABS of current change dI/dt, in the example, exceed 4.0 amps/nanosecond (A/ns). These spikes represent the edge rates in the transitions of the current flow I(RB2) in Amps (A), as also shown in the drawing. The first spike corresponds to a transition from high to low in the current trace (I(RB2)) and represents the rate at which the input current I turns off. The second spike in the ABS trace for the change (dI/dt) of the current corresponds to a transition from high to low in the current trace (I(RB2)) and represents the rate at which the input current I turns on. The lower graph in FIG. 1b depicts several of the voltages as they appear at different times in the circuit of FIG. 1a. The time scale of the upper and lower graphs coincide.

Assume that the circuit is in a state in which current I(RB2) is flowing through PMOS transistor P1 (see left portion of FIG. 1b). The waveforms V(P1) and V(N1) of FIG. 1b are the gate voltages of the PMOS (P1) and NMOS (N1) respectively. A PMOS turns on with a negative gate-source voltage. Since the source of P1 is at the input supply, P1 is on (low impedance) when V(P1) is low and off (high impedance) when V(P1) is high. Conversely a NMOS turns on with a positive gate-source voltage. Since the source of N1 is at ground, N1 is on (low impedance) when V(N1) is high and off (high impedance) when V(N1) is low. For the case where transistor P1 is on, and NMOS transistor N1 is off, we see that both V(P1) and V(N1) are both low. The low impedance of P1 drives the switch node voltage V(SW) high.

Now assume that it is time to transition from the state where V(SW) is high to a state in which the switch node voltage V(SW) is low, which means that the NMOS transistor N1 is on and no current is flowing through PMOS transistor P1. The transition must not allow both transistors P1 and N1 to be on at the same time (shoot-through), as this would allow a very large current flow through the low impedance switches and resistances to ground. Hence, the logic of the circuit will turn the PMOS transistor P1 off before turning the NMOS transistor N1 on.

When the SW node transitions low, the input current I(RB2) remains very high as the switch node transitions low and is quickly shut off when the SW node goes low enough to turn on the drain to substrate diode of NMOS (N1). More specifically, the SW node voltage V(SW) does not start slewing down until the drive to the PMOS P1 gate is reduced to the point where PMOS P1 can no longer supply the load current ILOAD (standing inductor current in the case of a buck converter). As the PMOS P1 gate drive is further reduced, the voltage V(SW) on the SW node will start to drop, but parasitic Miller capacitance and SW-to-VIN capacitance on the large PMOS transistor P1 keep the input current I(RB2) high, as the node voltage V(SW) transitions low. However, the input current very abruptly goes to zero as the SW node voltage bottoms out into the NMOS (N1), which is acting as a diode clamp.

The sudden drop in input current produces the spike, shown to the left in the upper graph of the current change. As the waveforms show, the supply pin switching current dI/dt is greater than 5 A/ns. At this rate, 1 nH of bond wire/pin inductance will induce a 5V spike on the input supply of an Integrated Circuit (IC). Additionally, the switch node transitions the full supply range in under 1 ns, which is undesirable from an EMI point of view.

The most common method of controlling the switch node transition is to drive the large switches of a DC/DC converter with weak drivers. The weak drivers slow the turn-on/turn-off time of the large switches, effectively reducing the slew rate of the switching node. However, this can result in undesirably long switch settling times for appreciable reductions in switch node slew rate and on-chip switching transients. Consider the following.

FIG. 2a is a circuit diagram showing a switch circuit for a DC-DC converter (again with the energy storage elements omitted, for convenience) for delivering a 5V output with a 1 A load current. Again, although the connection to the energy storage elements will vary depending on the desired application, buck, boost or inverter, the principal elements and arrangement of the switching circuit will be substantially similar.

The circuit of FIG. 2a is similar to that of FIG. 1a, except that the circuit of FIG. 2a implements the known technique for reducing problematic noise. FIG. 2a shows a buck switch configuration with the gate drive to the large PMOS (P1) and NMOS (N1) switches significantly reduced over that in FIG. 1a. In the example of FIG. 2a, the circuit uses higher impedance (weaker) inverters U5 and U15, to drive the gates of the strong switching transistors P1 and N1. The inverter U5 and U15 that drive the gates of the large PMOS (P1) and NMOS (N1) transistors are smaller, and thus presents a higher drive impedance at the respective gate of P1 or N1, than the comparable elements in the circuit of FIG. 1a. As a result, the higher impedance takes longer to discharge the Miller capacitance (from the source back to the gate) of P1 or N1, and tends to hold the respective transistor on longer in transitions. This tends to slow the slew rate of the switching transistors when transitioning from on to off or from off to on. Reducing the slew rate reduces the spikes in dI/dt that generate undesirable voltage spikes and EMI.

FIG. 2b shows selected switching waveforms for the circuit in FIG. 2a. Limiting the drive to the large PMOS and NMOS switches, as in the circuit of FIG. 2a, reduces the slew rate of the switching node. For example, in the transition of the switch node voltage V(SW) from on to off, the slope of the drop off is not as steep, and when the switch node voltage V(SW) bottoms out into the clamp diode of transistor N1, the current transition will be less abrupt. This effectively reduces the radiated EMI and shrinks the overall dI/dt transients on the supply input. Note that in this topology much of the switching time represents getting to/from the threshold voltage of the PMOS P1 or NMOS N1.

This method of drive control provides reduced supply current spikes, but at the expense of longer drive switch transition times. In the case of FIG. 2b, 2 A/ns dI/dt spikes are induced on the input supply. However, the time it takes the switches to settle out is nearly doubled. A dI/dt of 2 A/ns with 1 nH of bond wire inductance still will induce a 2V spike on the input supply voltage of an IC.

As shown by the example of prior art of FIGS. 2a, 2b, one is fighting a losing battle between total switching time and minimizing supply transients caused by slewing the switching node. Also, as the transition time of the switch node (SW) is not significantly reduced, only a minimal improvement in radiated EMI has been achieved.

The switches of DC/DC converters are generally made very large to reduce their effective impedance, thus reducing switch power loss. Because of this, transition from off to on of the PMOS (P1) and NMOS (N1) for a given inductor current occurs over a small range of the gate voltage swing. Since the actual gate voltage range for switch node transition is a very small portion of the total gate voltage swing, most of the switching time will be wasted transitioning to and from this control point. There are many variants of the prior art discussed above, but all known techniques for mitigating the effects of switching noise are based on reducing the drive to the converter switches (P1, N1) to control the slew rate of the switching node, which is fundamentally flawed for the reasons just presented.

Hence a need still exists for a technique of effectively mitigating the switching noise, that will still provide relatively fast total switching time.

SUMMARY

Slew rate of transitions between states at a switch node are controlled by providing a weaker second switching transistor, connected in parallel with a stronger main switching transistor, and then controlling the weaker transistor so as to have a slower slew rate in transitions between switch states.

Hence, a switching circuit might include a main switching transistor, a weak switching transistor and logic circuitry. The main switching transistor has one of its two output terminals coupled to a switch node. The weak switching transistor has a higher output impedance than the output impedance of the main switching transistor. Output terminals of the weak switching transistor are connected in parallel with the output terminals of the main switching transistor. The logic circuitry is coupled to control inputs of the main switching transistor and the weak switching transistor. In response to a clock signal, the logic circuitry drives the main switching transistor to toggle back and forth between on and off with a first slew rate. The logic circuitry also drives the weak switching transistor to toggle back and forth between on and off with a second slew rate slower than the first slew rate.

In the examples, the logic circuitry includes first logic coupled to the control input of the main switching transistor, to control the toggling of the main switching transistor on and off, with the first slew rate. Second logic, coupled to the control input of the weak switching transistor, controls the toggling of the weak switching transistor, so that on-off transitions exhibit the second slew rate slower than the first slew rate.

A plurality of the weaker transistors may be used and sequentially controlled, e.g. by digital logic. However, in the illustrated examples, the logic for controlling the weak switching transistor comprises at least one logic gate (e.g. a NAND and one or more inverters/buffers) responsive to the drive signal from the first logic circuitry that controls the main switching transistor, for driving the control input of the weak switching transistor. The exemplary second logic also includes capacitive feedback from the switch node to the control input of the weak switching transistor. In operation, the output impedance of the at least one gate circuit presented to the control input of the weak switching transistor and the capacitance of the feedback from the switch node determine the second slew rate.

An example is also disclosed which allows for selective disablement of the switching functions. This later example further includes control logic responsive to a disable signal, for disabling switching of the main switching transistor and the weak switching transistor.

The circuitry examples mainly apply to complimentary metal oxide semiconductor (CMOS) circuits, because CMOS implements voltage mode. Hence, in the disclosed examples, the switching transistors are metal oxide semiconductor field effect transistors. Those skilled in the art will recognize, however, that the broad teachings herein may be adapted to other types of switching technologies, e.g. using bipolar transistors. In the examples, the logic circuits and switching transistors are configured to support switching in response to clock rates generally greater than 1 MHz, but can also be applied to rates less than 1 MHz where fast transition time is desirable.

The examples utilize two main switching transistors, with a weaker transistor connected in parallel to each of the main switching transistors. In such a switching circuit, the first main switching transistor is a transistor of a first semiconductor type, and it has its source and drain coupled between a first power supply node and a switch node. A second main switching transistor is a transistor of a second semiconductor type opposite the first semiconductor type, and has its source and drain coupled between the switch node and a second power supply node. First logic circuitry is coupled to the gates of the main switching transistors, for controlling the first and second main switching transistors, responsive to phases of an input clock signal. The first logic circuitry toggles the main switching transistors back and forth, between a state in which the first main switching transistor is on but the second main switching transistor is off and a state in which the first main switching transistor is off and the second main switching transistor is on. This switching circuit also includes a first weak switching transistor, of the first semiconductor type, having a higher output impedance than the first main switching transistor. The source and drain of the first weak switching transistor are coupled between the first power supply node and the switch node, that is to say that they are connected in parallel with the source and drain of the first main switching transistor. A second weak switch transistor, of the second semiconductor type, has a higher output impedance than the second main switching transistor. The source and drain of the second weak switch transistor are coupled between the switch node and the second power supply node, that is to say they are connected in parallel with the source and drain of the second main switching transistor. Second logic circuitry controls the weak switching transistors to toggle between a state in which the first weak switching transistor is on but the second weak switching transistor is off and a state in which the first weak switching transistor is off and the weak second switching transistor is on, in accordance with phases of the input clock signal. However, toggling of the weak transistors exhibits a slew rate slower than the slew rate of the toggling of the main switching transistors.

Applications of the switching circuits disclosed herein include switching regulators (e.g. DC/DC converters, such as buck converters, boost converters and inverters). Hence, a switching DC/DC converter disclosed herein includes at least one strong main switching transistor and at least one weak switching transistor connected in parallel to each main switching transistor. The converter also includes circuitry configured to drive the main and weak switching transistors to toggle in response to phases of a clock signal. This drive circuitry is configured to control slew rate of toggling of the weak switching transistor(s) so as to reduce electromagnetic interference (EMI) and/or input supply noise.

DC/DC converter applications include buck and boost converters as well as inverters. The switching technique can be used in many other applications. The disclosed circuitry could also be used, for example, as a digital line driver to control the slew rate of a digital signal, while still being able to drive relatively large loads with minimal shoot-through. Any high frequency application that requires the controlled slewing of a node carrying a significant load could benefit from the disclosed circuitry.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1b is a signal diagram, which graphically depicts switching waveforms for the circuit in FIG. 1a.

FIG. 2b is a signal diagram, which graphically depicts switching waveforms for the circuit in FIG. 2a.

FIG. 3b is a signal diagram, which graphically depicts switching waveforms for the circuit in FIG. 3a.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 3A:
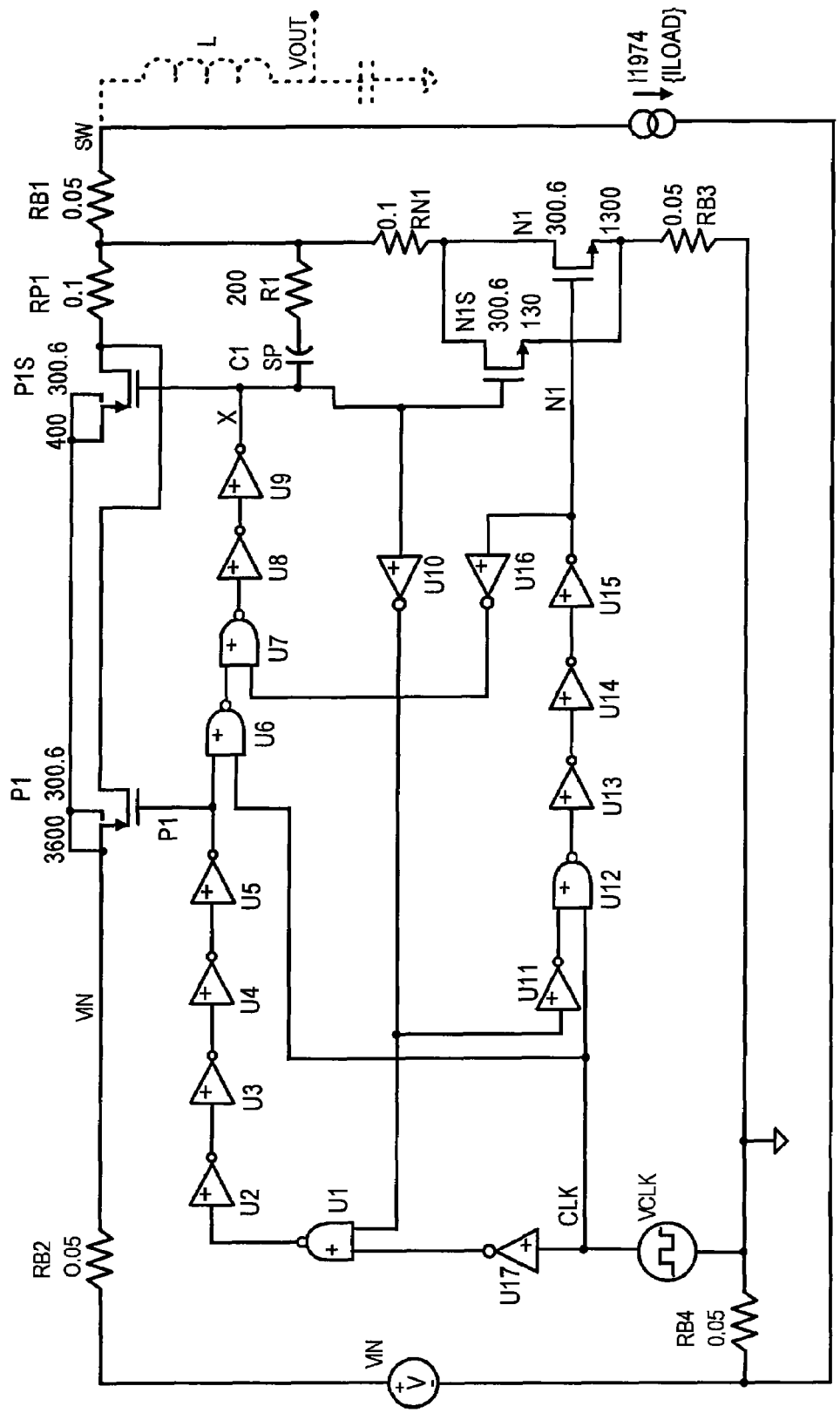
FIG. 3a is a circuit diagram of an exemplary switching circuit for a DC-DC converter, which uses parallel weaker switching transistors controlled to have a slower slew rate during switching transitions, so as to reduce electromagnetic interference (EMI) and/or input supply noise.
Figure 3B:
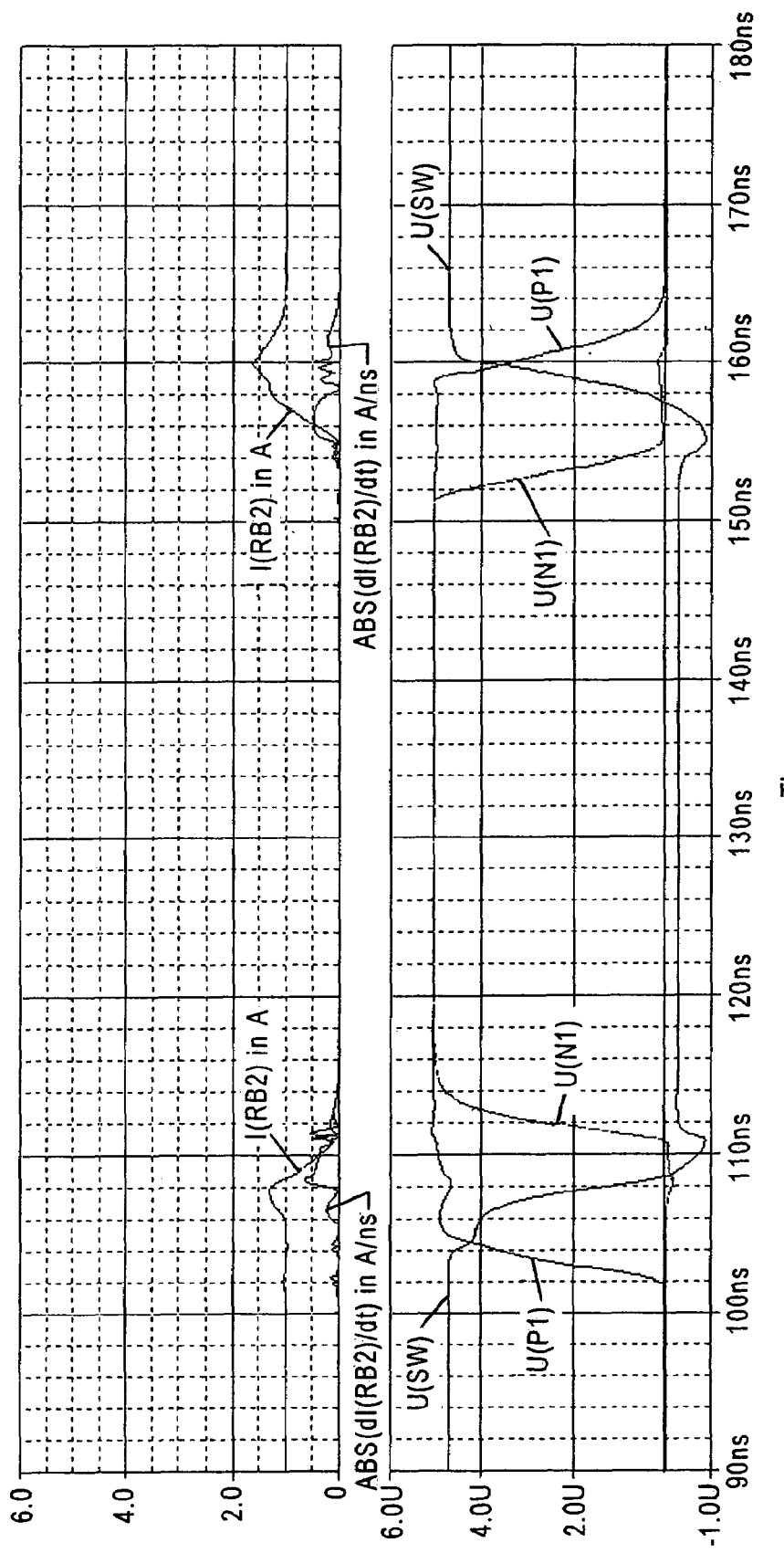

The various teachings herein relate to techniques to control slew rate of switching circuits, e.g. for DC to DC converters, without unduly sacrificing total switching time. A weaker second switching transistor is connected in parallel with a stronger main switching transistor. Switching of the weaker transistor exhibits a slower slew rate in transitions between switch states than transitions of the main transistor. The circuitry examples mainly apply to complimentary metal oxide semiconductor (CMOS) circuits, because CMOS implements voltage mode whereas BiPolar implements current mode, which significantly changes how logic cells are made and operate. Reference now is made in detail to the examples illustrated in the accompanying drawings and discussed below. FIG. 3a shows the circuitry of a first example; FIG. 3b illustrates the switching waveforms of the circuitry of FIG. 3a.

The illustrated switching circuitry provides alternate switching of complimentary conductivity type devices series connected between a voltage node and ground. The tap between the different types of switching devices forms a switching node SW. The voltage node and switching node are adapted to be connected to different external elements, depending on the application of the switching circuit.

The circuit diagram (FIG. 3a) is of a buck converter switch configuration. In this configuration, the voltage node connects to the power supply source, represented by VIN. Although connection to the energy storage elements shown will vary depending on the desired application, buck, boost or inverter, the principal elements and arrangement of the switching circuit are substantially similar. In buck converter configuration, the inductor L of the buck converter is connected from the switch node SW to the output voltage node ($V_O$). The current source load (ILOAD) represents the standing current as it would appear in an inductor L of the buck converter. For a DC/DC boost converter application, the switching circuitry is the same as that shown in FIG. 3a with the exception that the voltage node (equivalent to VIN in the buck converter configuration of FIG. 3a) becomes the voltage output node $V_O$, and the inductor is connected from a voltage source to the switch node SW.

The illustrated circuit example includes first and second main switching transistors P1, N1 of opposite conductivity types. The p-type metal oxide semiconductor (PMOS) type field effect transistor (FET) P1 selectively connects input voltage VIN through a small resistance (typically on-chip resistance) to the switch node SW. The n-type metal oxide semiconductor (NMOS) FET transistor N1 selectively connects switch node SW to ground, through small resistance (typically metal-on-chip resistance).

Figure 1A:
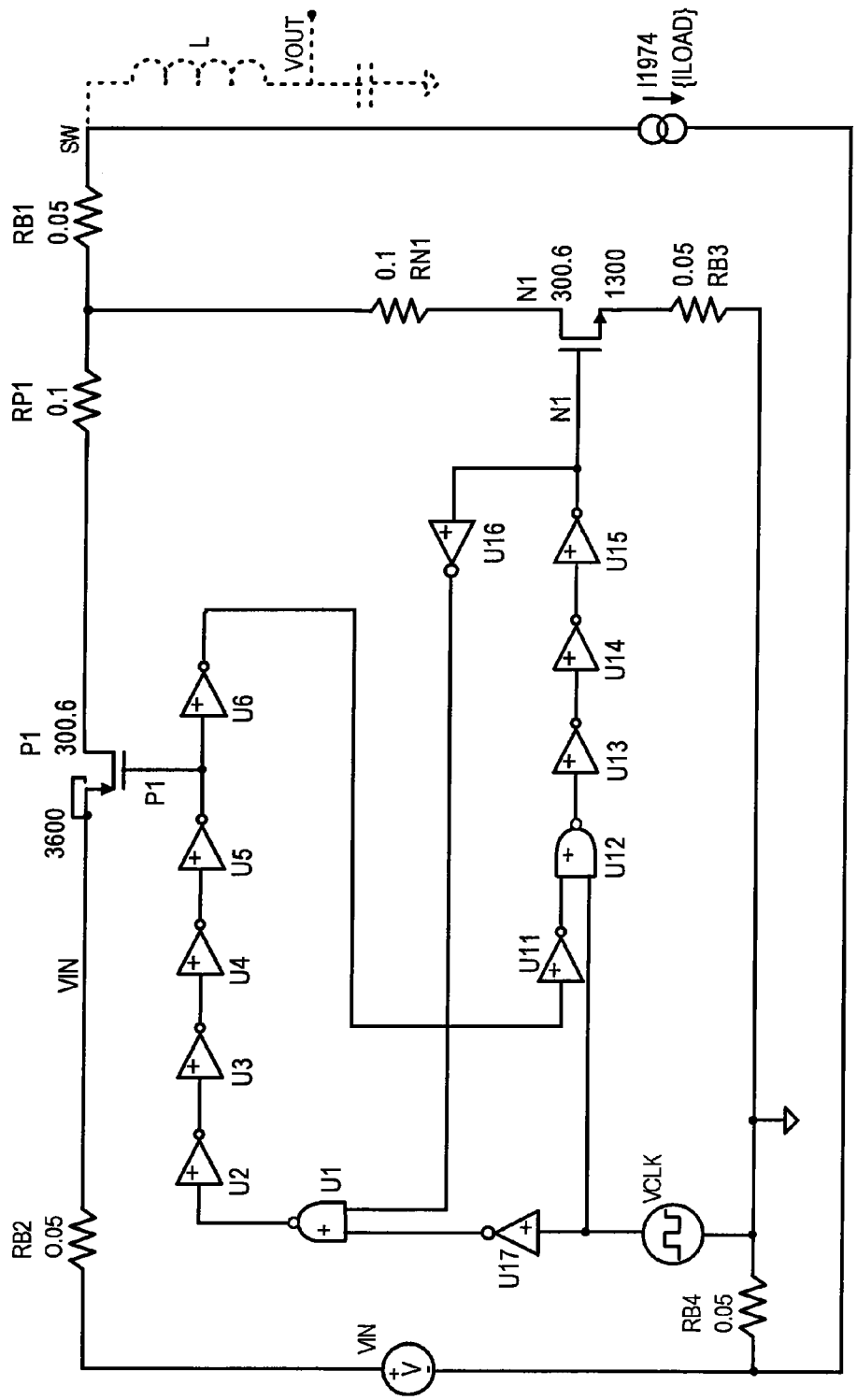
FIG. 1a is a circuit diagram of a prior art switching circuit for a DC-DC converter.
Figure 1B:
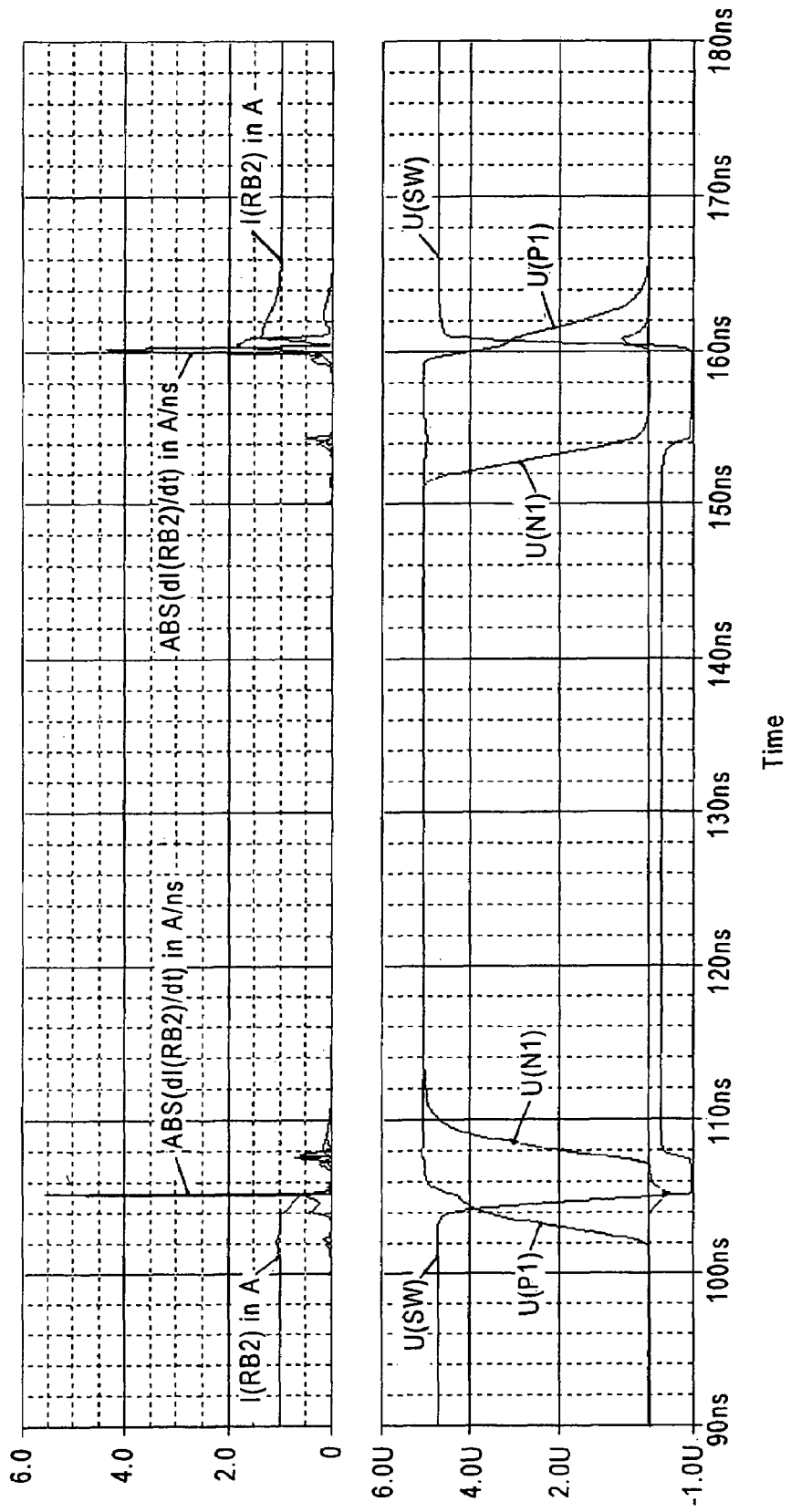

In this architecture, the large PMOS switching transistor P1 and the large NMOS switching transistor N1 are switched off very quickly like that of the FIG. 1a circuitry. The switching circuit also includes one or more smaller or weaker switching transistors connected in parallel to one or more of the main switching transistors. In the example of FIG. 3a, the circuit includes weaker transistors P1S, N1S. Each weaker transistor is of the same type, P or N, as the respective main switching transistor P1 or N1. Each weaker switching transistor has its output terminals connected in parallel to output terminals of one of the main switching transistors, for each of the main transistors. In the example, weak transistor P1S has its source and drain connected in parallel with those of the main switching transistor P1, whereas weak transistor N1S has its source and drain connected in parallel with those of the main switching transistor N1. In the example, the transistors P1S and N1S act as an inverter to drive the SW node when the large PMOS and NMOS switches are off.

The switching transistors P1 and N1 are relatively strong transistors, for efficiency, in that the characteristic impedance from drain to source when each transistor is on is very low. For a given flow of current through such a transistor when on, a lower impedance means that the transistor exhibits a lower voltage drop from drain to source and consumes less power. For the strong switching transistors P1 and N1, the characteristic impedance from drain to source is on the order of 1Ω or less, and more often on the order of tens to hundreds of mΩ, to get 90% efficiency for the regulator circuit, although they are generally sized to facilitate the output requirements of the particular converter application.

The smaller PMOS transistor P1S, with its source and drain connected in parallel across the source and drain of the strong PMOS switching transistor P1, is weaker than the transistor P1 in that transistor P1S has a higher characteristic impedance from drain to source when transistor P1S is on, than does the corresponding strong transistor P1. Similarly, the smaller NMOS transistor N1S, with its source and drain connected in parallel across the source and drain of the strong NMOS switching transistor N1, is weaker than the transistor N1 in that the transistor N1S has a higher characteristic impedance from drain to source when transistor N1S is on, than does the corresponding strong transistor N1.

As noted, the characteristic impedance from drain to source for each of the strong switching transistors P1 and N1 is on the order of 1Ω or less, and more often, on the order of tens to hundreds of mΩ. P1S and N1S are much weaker transistors than the large PMOS and NMOS switching transistors P1, N1. The characteristic impedance from drain to source for each of the smaller transistors P1S and N1S is generally on the order of 5 to 50 times larger than the characteristic impedance of their respective larger switch P1 or N1, and are preferably sized only to be large enough to handle the inductor peak load current. In the case of FIG. 3a, the impedance of P1S and N1S are about 10 times larger than the impedance of P1 and N1 respectively.

The gates of the smaller transistors P1S and N1S are driven by a voltage on node X of the circuit. A resistor R1 and capacitor C1 provide feedback to node X. The capacitor C1 and weak drive inverter U9 set the slew rate of the switching node (SW).

The other elements of the circuit shown in FIG. 3a relate to the logic circuitry to control the timing of the switching on and off of the main switching transistors P1 and N1 and the weaker switching transistors P1S and N1S, in response to the high-speed switching signal VCLK. Logic gates U1 to U5 drive toggling of transistor P1 in response the inverted clock signal, whereas logic gates U11 to U15 drive toggling of transistor N1 in response the clock signal. This first logic to control the main switching transistors P1, N1 is similar to that used in the example of FIG. 1a.

The four inverters U2 to U5 that drive the PMOS transistor P1 are successively larger by a factor of approximately 10, to scale the output from the NAND gate U1 up to a level sufficient to drive the large/strong PMOS switching transistor P1. Similarly, the three inverters U13 to U15 that drive the NMOS transistor N1 are successively larger by a factor of approximately 10, to scale the output from the NAND gate U12 up to a level sufficient to drive the large/strong NMOS switching transistor N1. In each case, the output of a very small capacitance device (first inverter U2 or U13) is scaled up to drive a very large capacitance switch device P1 or N1.

VIN is the DC input voltage from the power supply to the chip. The input voltage is applied to the PMOS transistors through a resistor RB2. The current through resistor RB2 is the input current (I(RB2)) flowing from the DC power source to the IC chip.

VCLK is the clock for switching the DC-DC converter circuit. In the example, toggling the clock between high and low phases toggles the switches between a state in which P1 is on in one clock phase and a state in which N1 is on in the other clock phase. The clock typically is higher than 1 MHz, and in the example is 100 MHz. The elements of the first set of circuit logic essentially insure a non-overlap timing of the on states of the P1 and N1 transistors.

The illustrated switching circuit also includes second logic circuitry to drive the weaker transistors P1S and N1S. The second logic circuitry is coupled to the gates of the weak switching transistors P1S, N1S at node X in the drawing. The gates U6 to U9 respond to the drive signal on the gate of P1, and thus are responsive to the phases of VCLK, to drive the weak switching transistors. However, the second logic also includes the feedback through resistor R1 and capacitor C1. This second logic toggles weak transistors P1S and N1S, between a state in which P1S is on but N1S is off and a state in which P1S is off and N1S is on, in accordance with the phases of the input clock signal, but at a slew rate slower than the slew rate of the toggling of the main switching transistors P1, N1.

Consider now an example of the operation of the illustrated logic. When VCLK is 0, P1 and P1S are on and a low voltage drop appears across the parallel PMOS transistors. Current flows from the source through the PMOS transistors (mainly through P1) to the switch node (SW). In this state, the NMOS transistors N1, N1S are off. The voltage at the switch node V(SW) is high.

When VCLK goes from logic state 0 to logic state 1, the inverter U17 applies a logic state 0 to one input of NAND gate U1. A NAND gate, such as gate U1, produces a 1 on its output except when both its inputs simultaneously receive logic state 1. Hence, the logic state 0 supplied by clock inverter U17 will cause the output of NAND gate U1 to go to a logic state 1, which will propagate through inverters U2, U3, U4 and U5 so as to apply logic state 1 to the gate of transistor P1, which turns transistor P1 off. Since the last inverter U5 is: a strong device, the 1 applied to the gate will turn P1 off quickly and quickly cut-off current flow through the device P1.

The output of the inverter U5 also supplies the 1 state to an input of NAND gate U6. Because a transition starts when VCLK switches from logic state 0 to logic state 1. The other input of NAND gate U6 receives VCLK, so it has been at a 1 state and has held the output of U6 at logic state 1, for some time, as the state change of VCLK propagates through U1 to U5. When inverter U5 applies the 1 state, both inputs of NAND gate U6 are at logic state 1, and therefore the output of NAND gate U6 changes to logic state 0.

As noted, the NMOS devices N1, N1S have been in an off state, which requires a 0 at the gates thereof. Inverter U16 is responsive to the gate voltage applied to the strong NMOS transistor N1 and has been outputting a 1 to an input of NAND gate U7. When NAND gate U6 changes its output from 1 to 0, the output of NAND gate U7 goes from 0 to 1. Inverter U8 outputs a 0, and inverter U9 outputs a 1, to bring the node X from 0 up to 1. Node X provides the gate voltages to the weak transistors P1S and N1S, and a transition to 1 on node X turns on N1S and turns off P1S. The capacitance at X, provided by C1, however, tends to slow the transition at the node X and thus the state transitions of weak transistors P1S and N1S.

The state appearing on node X is fed back to the other input of the NAND gate U1 through a inverter U10. When node X reaches the 1 state, inverter U10 outputs a 0. An inverter U11 also is responsive to the output of U10, and inverter U11 now applies a 1 to an input of NAND gate U12. NAND gate U12 also is responsive to VCLK, which has just gone from 0 to a 1 state, in the example, so the output of NAND gate U12 goes from 1 to 0. This propagates through three inverters U13, U14 and U15 so as to change the signal applied to the gate of strong switching transistor N1 from 0 to 1. Since the last inverter U15 is a strong device, the 1 applied to the gate will turn N1 on quickly to quickly enable current flow through the device N1.

To summarize the example, as soon as the clock signal VCLK goes 0 from to 1, the logic turns off the large PMOS switching transistor P1. The circuit transitions from a state in which the small PMOS switching transistor P1S was on and the small NMOS switching transistor N1S was off to a state in which the small PMOS switching transistor P1S is off and the small NMOS switching transistor N1S is on. The capacitance C1 and the output impedance of the driver/inverter U9 determine the slew rate of the transition. The resistor R1 adds a zero to the impedance of the feedback through capacitor C1 but does not greatly affect the slew rate. When the transition of the small transistors is substantially complete, node X reaches a 1 state, and that state change propagates back through U15 to turn on the large NMOS switching transistor N1.

The above discussion focused on the transition in which VCLK goes from 0 to 1, that is to say from the state in which P1 and P1S are on (N1, N1S are off) to the state in which N1 and N1S are on (P1 and P1S are off). Those skilled in the art will appreciate how the illustrated logic functions to implement the alternative state transition when VCLK goes from 1 back to 0. Briefly, when VCLK goes from 1 back to 0, that change propagates through NAND gate U12 and inverters U13 to U15 to turn off the large NMOS switching transistor N1. Inverter U16 supplies a 0 to gate U7 to initiate the transition from the state in which the small NMOS switching transistor N1S was on and the small PMOS switching transistor P1S was off to a state in which the small NMOS switching transistor N1S is off and the small PMOS switching transistor P1S is on. Again, the capacitance C1 and the output impedance of the driver/inverter U9 determine the slew rate of the transition for the small/weak transistors. When the transition of the small transistors is substantially complete, node X reaches a 0 state. The inverter U10 supplies a 0 to the input of NAND gate U1, and that state change propagates back through inverters U2 to U5 to turn on the large PMOS switching transistor P1.

Using this method, the SW node is gracefully transitioned in both directions (see FIG. 3b). The turn-off of the large transistors can be relatively fast (controlled by strong drivers). However, the slower transition provided by the parallel transistors provides a more gradual transition for the switch node voltage V(SW) and the input current.

With regard to the waveforms, again consider a situation where the SW node transitions from high to low. The strong drivers can turn off transistor P1 quickly (steep rise in voltage V(P1)). When transistor P1 was on, most of the input current I(RB2) runs through the device P1. However, now that transistor P1 has shut-off, input current I(RB2) flows through the parallel weaker PMOS transistor P1S. Because P1S and N1S are sized much smaller and weaker, the gradual slewing of node X allows a gradual turn off of P1S and turn on of P1N, without significant shoot through current from the input to the ground. Once, the switch node SW has transitioned low, all the load current (ILOAD) now flows through the weaker NMOS N1S. Now the strong NMOS transistor N1 turns on very quickly, as shown at V(N1) in FIG. 3b. When transistor N1 turns on, the majority of the load current (ILOAD) will flow through the larger transistor N1 and the source drain voltage across parallel transistors N1, N1S snaps up and becomes quite small. This limits power loss during the low state of the SW node and thus maintain the desired circuit efficiency.

Figure 2A:
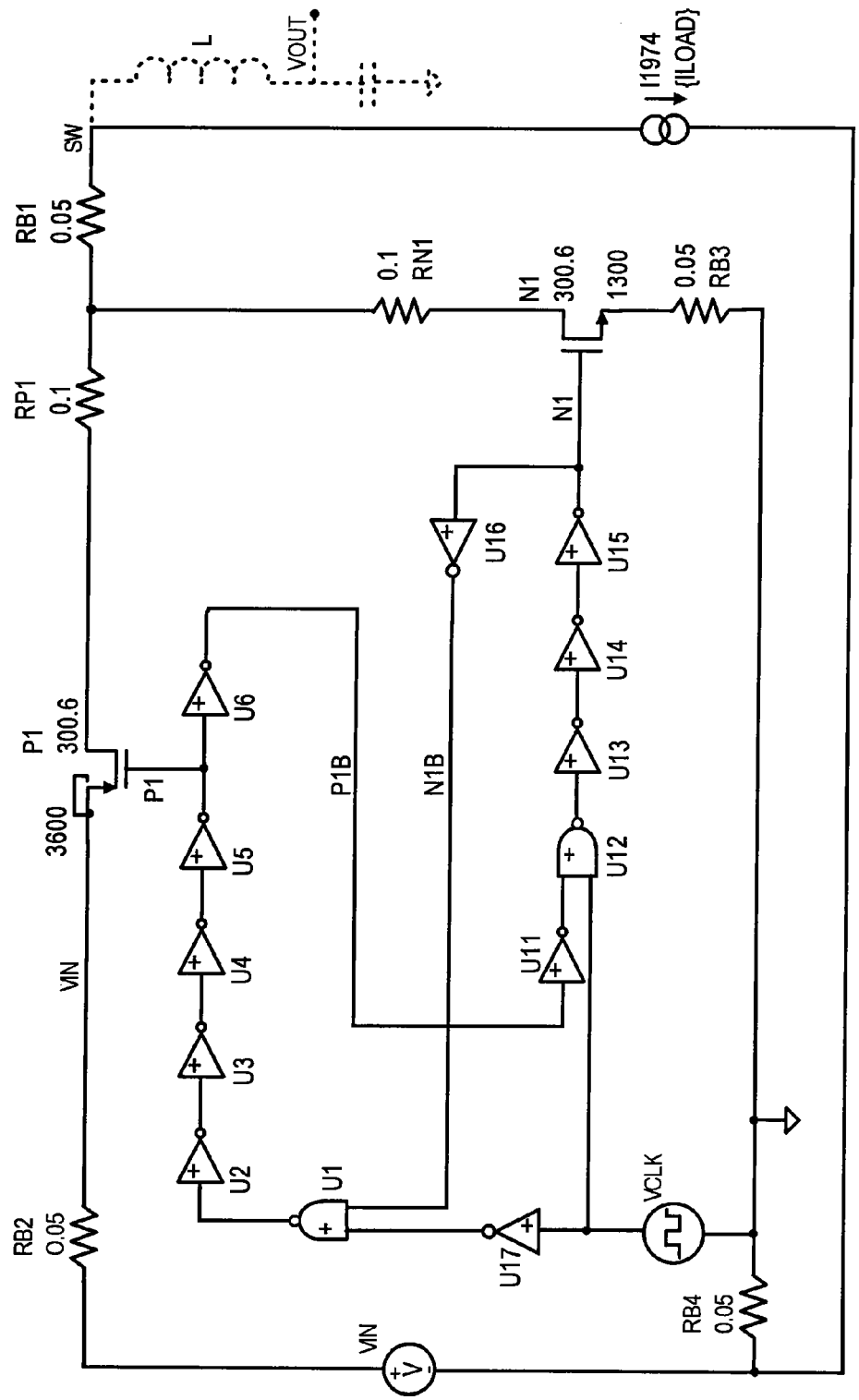
FIG. 2a is a circuit diagram of a prior art switching circuit for a DC-DC converter, using weaker switch drivers to reduce the switching slew rate and thus reduce on-chip voltage spikes and EMI.
Figure 2B:
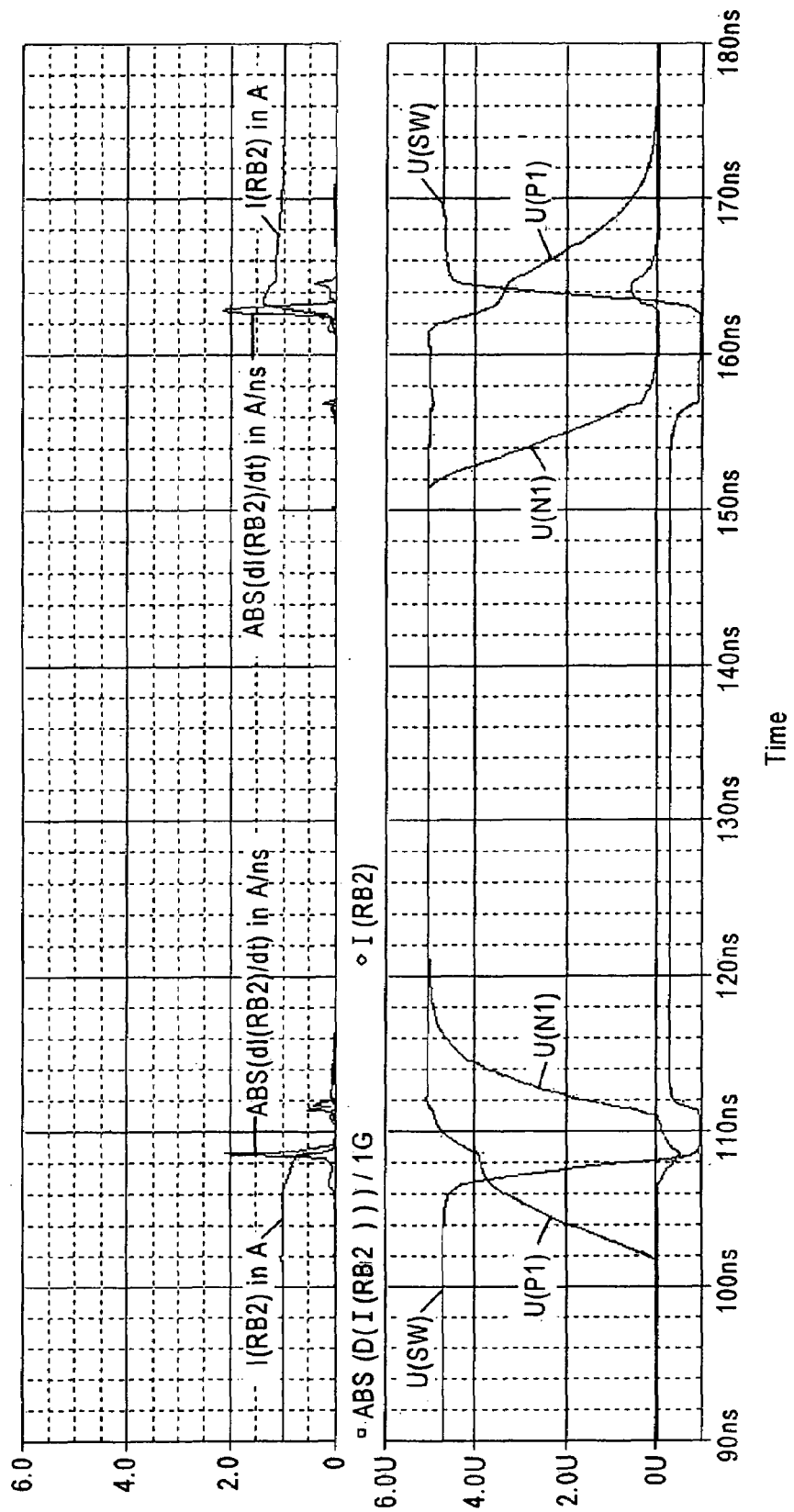

The more graceful transitions in the voltage on the SW node result in a significant reduction in the input and ground dI/dt transients. As shown in the upper part of FIG. 3b, the dI/dt spikes produced are on the order of 0.5 A/ns, which is reduced by a factor of 4 compared even to the reduced spikes in the better prior art performance provided by the circuit of FIG. 2a (compare FIG. 3b to FIG. 2b). At this rate, in H of bond wire/pin inductance will cause a 0.5V spike on the input supply of an IC. The slower slew rate of the switch node voltage V(SW) also results in a reduction in radiated EMI external to the IC.

There is some shoot through current during the transition, but it is well controlled since P1S and N1S are weak. The shoot through current should only cause minor efficiency losses since the SW node is still transitioned fairly quickly. This method of switching is almost as fast as that of FIG. 1a, but the supply and ground dI/dt have been reduced by a factor of 10× over that of FIG. 1A. Also note that P1S is on when the large PMOS is on and N1S is on when the large NMOS N1 is on, so they are both effectively part of the SW node drive.

Figure 4:
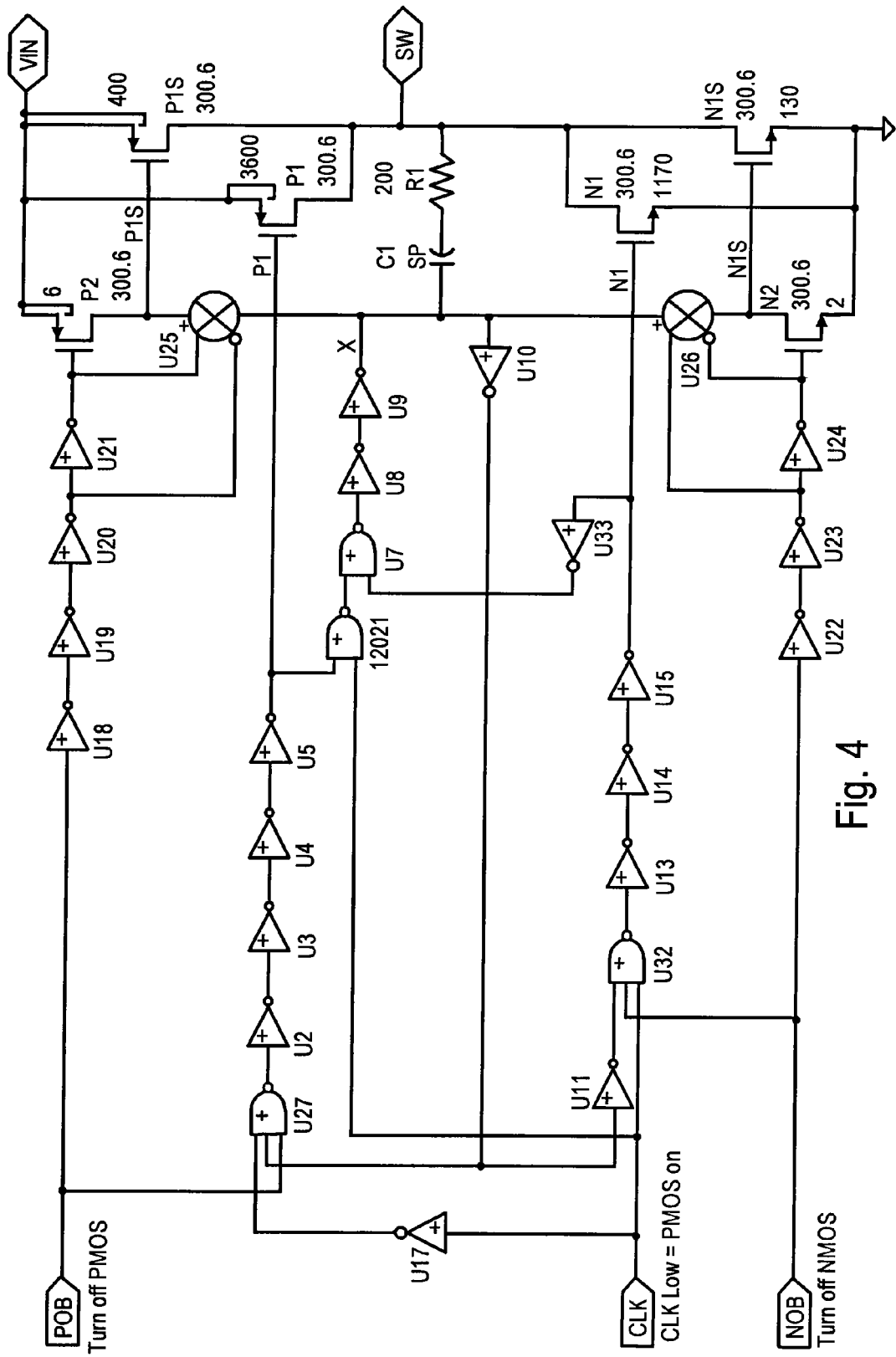
FIG. 4 is a circuit diagram of another example of the switching circuit using parallel weaker switching transistors with additional logic to selectively disable switching.

FIG. 4 is a schematic showing additional inputs that allow P1S and N1S to be turned off. Generally, the circuit and its elements are similar to those of FIG. 3a. The added control is simply a matter of using TGATEs U25 and U26 to disconnect P1S and N1S from the weak driver output (node X) and transistors P2 and N2 to short their respective gates to VIN and Ground respectively. The initial NAND gates responsive to the clock state transitions, now gates U27 and U32 (compare to U1 and U12 in FIG. 3a) are also responsive to the signals to turn on/off the large PMOS P1 and NMOS N1 transistors. With POB high and NOB high, the circuit of FIG. 4 operates exactly as described above with regard to FIG. 3b in response to VCLK.

However, a low signal on the POB input disables P1S. The low signal on POB also propagates through and immediately turns off P1. A low signal on the NOB input disables N1S, and the low signal on NOB propagates through and immediately turns off N1. This allows the SW node to go to a high impedance, which may be necessary for many buck switching architectures, e.g. to prevent voltage overshoot when loading of the converter is low.

Even though the above examples focus on DC/DC buck converter examples, the switching technique can be used in many other applications. For example this method of switching can be used for a DC/DC boost converter. The circuitry is the same as that shown in FIG. 3a with the exception that VIN now becomes VOUT, and the inductor is connected from VIN to node SW. The disclosed circuitry is also used as a digital line driver to control the slew rate of a digital signal, while still being able to drive relatively large loads with minimal shoot-through. Any high frequency application that requires the controlled slewing of a node carrying a significant load could benefit from the disclosed circuitry.

The examples of FIGS. 3a and 4 turn off the large switching transistors quickly while keeping a driving circuit attached to the switching node which can transition the switch node gracefully from one level to another. In the disclosed examples, the driving circuit is an inverter (P1S, N1S) with feedback capacitor (C1) and weak driver (U9). This is the simplest method. The IC area required to create such a circuit (FIG. 3A) is only slightly large than requires for the prior art (FIG. 1a), due to the fact that P1S and N1S are part of P1 and N1 respectively keeping the overall switch size the same. Thus, IC area only has to grow by the size of capacitor C1 and additional logic.

The above examples provide a driving structure consisting of small FET transistors connected to a switch node for controlled slewing of the switch node when the large FET switch transistors are off. Another approach for reducing the switching transient is to have a number of smaller switches (like P1S) that cascade off after turning off the main switch (P1). This creates a digitally increasing impedance at the switch node and helps to control the slewing of the switch node. However, this variation does not achieve the level of results that the above-discussed examples provide with the single smaller FET in parallel with each large FET switch transistor. First, digitally cascading several nodes off requires more time than the slewing of the illustrated examples, and the digital nature of such an alternative architecture causes the switch node to fall in a squared fashion (i.e. slow at first and fast at the end), which results in larger supply transients than the illustrated circuitry. However, the cascade approach provides some improvement over the prior art. Again the smaller transistors have a wider control range for a given load current, which helps in the control process.

The switching techniques discussed above are amenable to a variety of modifications. For example, the examples use a unipolar positive supply. Those skilled in the art will recognize that the switching will work equally as well with a bipolar supply (i.e. replace the NMOS ground with a negative supply) or a unipolar negative supply (i.e. replace PMOS input supply with ground and NMOS ground with negative supply).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A switching circuit, comprising:
   a first main switching transistor, of a first conductivity type, having a source and drain coupled between a first power supply node and a switch node;
   a second main switching transistor, of a second conductivity type opposite the first conductivity type, having a source and drain coupled between the switch node and a second power supply node;
   first logic circuitry responsive to phases of an input clock signal and coupled to gates of the first and second main switching transistors, for controlling the first and second main switching transistors to toggle between a state in which the first main switching transistor is on and the second main switching transistor is off and a state in which the first main switching transistor is off and the second main switching transistor is on, in response to phases of the input clock signal;
   a first weak switching transistor of the first conductivity type having a higher output impedance than the first main switching transistor and having a source and drain coupled between the first power supply node and the switch node in parallel with the source and drain of the first main switching transistor;
   a second weak switching transistor of the second conductivity type having a higher output impedance than the second main switching transistor and having a source and drain coupled between the switch node and second power supply node in parallel with the source and drain of the second main switching transistor; and second logic circuitry, coupled to gates of the first and second weak switching transistors for controlling the first and second weak switching transistors to toggle between a state in which the first weak switching transistor is on and the second weak switching transistor is off and a state in which the first weak switching transistor is off and the second weak switching transistor is on, in accordance with the phases of the input clock signal, and at a slew rate slower than a slew rate of the toggling of the first and second main switching transistors.

2. The circuit of claim 1, wherein the weak switching transistors transition the output node during a period when both main transistors are high impedance, during toggling of the main switching transistors between states.

3. The circuit of claim 1, wherein the second logic circuitry comprises:

at least one logic gate, responsive to signals applied to the gates of the first and second main switching transistors by the first logic circuitry, for driving the gates of the first and second weak switching transistors; and capacitive feedback from the switch node.

4. The circuit of claim 3, wherein (1) the output impedance of the at least one logic gate presented to the gates of the first and second weak switching transistors and (2) capacitance of the feedback from the switch node determine the slew rate for toggling between states of the first and second weak switching transistors.

5. The circuit of claim 1, further comprising control logic responsive to a disable signal for disabling switching of at least one of the main switching transistors and at least one of the weak switching transistors.

6. The circuit of claim 1, wherein the voltage node is located for receiving an input voltage and the switch node is located for connection to an inductor, for application of the circuit in a DC to DC buck converter.

* * * * *